(12) United States Patent
Xu et al.

(10) Patent No.: US 10,485,007 B2
(45) Date of Patent: Nov. 19, 2019

(54) METHOD AND DEVICE FOR PERFORMING CARRIER SCHEDULING

(71) Applicant: China Academy of Telecommunications Technology, Beijing (CN)

(72) Inventors: Weijie Xu, Beijing (CN); Xueming Pan, Beijing (CN); Zukang Shen, Beijing (CN); Jiaqing Wang, Beijing (CN); Qianqian Si, Beijing (CN)

(73) Assignee: China Academy of Telecommunications Tehcnology, Beijing (CN)

( * ) Notice: Subject to any disclaimer, the term of this patent is extended or adjusted under 35 U.S.C. 154(b) by 162 days.

(21) Appl. No.: 15/524,930

(22) PCT Filed: Nov. 2, 2015

(86) PCT No.: PCT/CN2015/093606
§ 371 (c)(1),
(2) Date: Aug. 9, 2017

(87) PCT Pub. No.: WO2016/070772
PCT Pub. Date: May 12, 2016

(65) Prior Publication Data
US 2017/0347365 A1 Nov. 30, 2017

(30) Foreign Application Priority Data
Nov. 5, 2014 (CN) .......................... 2014 1 0637674

(51) Int. Cl.
*H04W 72/08* (2009.01)
*H04L 5/00* (2006.01)
(Continued)

(52) U.S. Cl.
CPC ........... *H04W 72/12* (2013.01); *H04L 1/0026* (2013.01); *H04L 5/0032* (2013.01); *H04L 47/10* (2013.01);
(Continued)

(58) Field of Classification Search
CPC .... H04W 76/14; H04W 72/042; H04L 5/0055
(Continued)

(56) References Cited

U.S. PATENT DOCUMENTS

| 2011/0249584 A1 | 10/2011 | Barbieri et al. |
| 2013/0195011 A1 | 8/2013 | Kikuzuki |

(Continued)

FOREIGN PATENT DOCUMENTS

| CN | 103392373 A | 11/2013 |
| CN | 103765824 | 4/2014 |

(Continued)

OTHER PUBLICATIONS

NTT Docomo: "Inter-operator and Inter-RAT co-existence techniques for LAA using LTE",3GPP Draft; R1-144339 Inter-Operator and Inter-RAT Co-Existence Techniques Für LAA Using LTE Final, 3rd Generation Partnership Project (3GPP), Mobile Technical Fields Competence Centre ; 650, Route Des Searched (IPC) Lucioles ; F-06 H04W, HO4L vol. RAN WG1, na. Ljubljana, Slovenia; (Oct. 7, 2014).

Primary Examiner — Iqbal Zaidi
(74) *Attorney, Agent, or Firm* — Foley & Lardner LLP

(57) ABSTRACT

Embodiments of the present application relate to the technical field of wireless communications, and in particular, to a method and a device for performing carrier scheduling, which are used to perform scheduling for an unlicensed carrier. In the embodiments of the present application, a terminal performs uplink channel measurement in an uplink subframe or an uplink measurement time period of an (Continued)

unlicensed carrier, to determine uplink channel quality information, and/or performs downlink channel measurement in a downlink subframe of the unlicensed carrier, to determine downlink channel quality information; and the terminal notifies a network side device of the determined uplink channel quality information, and the network side device determines, according to the received uplink channel quality information, whether to perform uplink scheduling on the terminal on the unlicensed carrier, and the terminal notifies the network side device of the determined downlink channel quality information, so that the network side device determines, according to the received downlink channel quality information, whether to perform downlink scheduling on the terminal on the unlicensed carrier. In this way, scheduling is implemented for the unlicensed carrier, thereby further improving system performance.

13 Claims, 4 Drawing Sheets

(51) Int. Cl.
*H04L 12/801* (2013.01)
*H04W 36/00* (2009.01)
*H04W 72/12* (2009.01)
*H04L 1/00* (2006.01)
*H04W 36/22* (2009.01)

(52) U.S. Cl.
CPC ....... *H04W 36/0066* (2013.01); *H04W 36/22* (2013.01); *H04W 72/085* (2013.01)

(58) Field of Classification Search
USPC .................................................. 370/252–339
See application file for complete search history.

(56) References Cited

U.S. PATENT DOCUMENTS

| | | |
|---|---|---|
| 2014/0044105 A1 | 2/2014 | Bontu et al. |
| 2016/0007350 A1* | 1/2016 | Xiong .................. H04W 24/10 370/252 |
| 2017/0265096 A1* | 9/2017 | Goto ........................ H04J 11/00 |
| 2018/0219667 A1* | 8/2018 | Zhao ...................... H04L 5/001 |

FOREIGN PATENT DOCUMENTS

| | | |
|---|---|---|
| CN | 103765924 A | 4/2014 |
| WO | WO-01/17136 A1 | 3/2001 |
| WO | WO2012171931 | 12/2012 |
| WO | WO2013166472 A2 | 11/2013 |
| WO | WO2014023458 | 2/2014 |
| WO | WO2014107357 | 7/2014 |

* cited by examiner

METHOD AND DEVICE FOR PERFORMING CARRIER SCHEDULING

This application is a National Stage of International Application No. PCT/CN2015/093606, filed Nov. 2, 2015, which claims priority of Chinese Patent Application No. 201410637674.2, filed with the Chinese Patent Office on Nov. 5, 2014, both of which are hereby incorporated by reference in their entireties.

FIELD

The present invention relates to the field of wireless communications, and particularly to a method and device for scheduling over a carrier.

BACKGROUND

As there are a constantly growing number of mobile data services, spectrum resources appear more and more insufficient, and a demand for a large number of services may not be satisfied by deploying a network and transmitting the services only over licensed spectrum resources, so transmission may alternatively be deployed over unlicensed spectrum resources in a Long Term Evolution (LTE) system, which is referred to as an Unlicensed LTE (simply U-LTE or LTE-U) system, so as to improve the experience of a user, and to extend the coverage area of the system.

The unlicensed spectrum resources have not been planed for any particular application system, but can be shared by various wireless communication system, e.g., Bluetooth, Wireless Fidelity (WiFi), and other systems, all of which access the shared unlicensed spectrum resources by preempting the resources, so coexistence between LTE-Us deployed by different operators, and between the LTE-Us, and WiFi and other wireless communication systems has been studied as a focus. In the 3GPP, fair coexistence between the LTE-Us, and the WiFi and other wireless communication systems is required to be guaranteed, and an unlicensed frequency band is arranged as a secondary carrier with the assistance of a primary carrier in a licensed frequency band. The technology of Listen Before Talk (LBT) has been accepted by almost all the enterprises as a general mode in which the LTE-Us compete for an access. Essentially in the LBT technology, an 802.11 system operates with the Carrier Sense Multiple Access with Collision Detection (CSMA/CD) mechanism, and a WiFi system preempts a resource in an unlicensed spectrum. Firstly each node listens to a channel, and if the channel becomes idle in a Distributed Inter-Frame Space, then the node will determine the current channel as an idle channel, and then the respective nodes waiting for a channel to access enter a random fallback phase to thereby avoid a number of nodes from colliding over the same resource. Furthermore in order to guarantee unfairness, no node shall preempt a spectrum resource for a long period of time, but if some temporal or amount-of-transmitted-data upper-limit is reached, then the resource will be released for preemption by another device/system.

However there has been absent so far a solution for scheduling over an unlicensed carrier.

SUMMARY

Embodiments of the invention provide a method and device for scheduling over a carrier so as to schedule over an unlicensed carrier.

An embodiment of the invention provides a method for scheduling over a carrier, the method including:

measuring, by a UE, an uplink channel in uplink sub-frames or an uplink measurement period of time over an unlicensed carrier, and determining uplink channel quality information, and/or measuring a downlink channel in downlink sub-frames over the unlicensed carrier, and determining downlink channel quality information; and notifying, by the UE, a network-side device of the determined uplink channel quality information, so that the network-side device judges whether to schedule the UE in the uplink over the unlicensed carrier, according to the received uplink channel quality information; and notifying the network-side device of the determined downlink channel quality information, so that the network-side device judges whether to schedule the UE in the downlink over the unlicensed carrier, according to the received downlink channel quality information.

Preferably the uplink channel quality information includes a part or all of the following information:

a RSSI, a success probability of potential competition for the uplink channel, the number of devices in an enabled operating state over the unlicensed carrier in each other unlicensed system than a system where the UE is located, and total power of the other unlicensed systems than the system where the UE is located, over the unlicensed carrier; and the downlink channel quality information includes a RSSI.

Preferably the uplink channel quality information includes the success probability of potential competition for the uplink channel, and the uplink measurement period of time is a competition window; and measuring, by the UE, the uplink channel in the uplink measurement period of time, and determining the downlink channel quality information includes:

determining, by the UE, the competition window for resource competition; and measuring, by the UE, the uplink channel in the determined competition window, and determining the uplink channel quality information.

Preferably measuring, by the UE, the uplink channel in the uplink sub-frames over the unlicensed carrier, and determining the uplink channel quality information includes:

measuring, by the UE, the uplink channel in a set of uplink sub-frames configured by the network side, and determining the uplink channel quality information.

Preferably measuring, by the UE, the uplink channel includes:

if the uplink channel quality information includes the number of devices in an enabled operating state over the unlicensed carrier in each other unlicensed system than the system where the UE is located, then determining, by the UE, the number of devices in an enabled operating state over the unlicensed carrier in each other unlicensed system than the system where the UE is located, through a first stand-alone module configured in the UE to operate in the other unlicensed system; and if the uplink channel quality information includes the total power of the other unlicensed systems than the system where the UE is located, over the unlicensed carrier, then determining, by the UE, the total power of the other unlicensed systems than the system where the UE is located, over the unlicensed carrier, through second standalone modules configured in the UE to operate in the other unlicensed systems.

An embodiment of the invention provides another method for scheduling over a carrier, the method including:

receiving, by a network-side device, uplink channel quality information and/or downlink channel quality information fed back from a UE for an unlicensed carrier;

judging, by the network-side device, whether to schedule the UE in the uplink over the unlicensed carrier, according to the received uplink channel quality information; and judging, by the network-side device, whether to schedule the UE in the downlink over the unlicensed carrier, according to the received downlink channel quality information.

Preferably the uplink channel quality information includes a part or all of the following information:

a RSSI, a success probability of potential competition for the uplink channel, the number of devices in an enabled operating state over the unlicensed carrier in each other unlicensed system than a system where the UE is located, and total power of the other unlicensed systems than the system where the UE is located, over the unlicensed carrier; and the downlink channel quality information includes a RSSI.

Preferably judging, by the network-side device, whether to schedule the UE in the uplink over the unlicensed carrier, according to the received uplink channel quality information includes:

if the uplink channel quality information includes the RSSI, then judging, by the network-side device, whether the RSSI is below a first threshold, and if so, then scheduling the UE in the uplink over the unlicensed carrier, otherwise, not scheduling the UE in the uplink over the unlicensed carrier;

if the uplink channel quality information includes the success ratio of potential competition for the uplink channel, then judging, by the network-side device, whether the success ratio of potential competition for the uplink channel is above a second threshold, and if so, then scheduling the UE in the uplink over the unlicensed carrier, otherwise, not scheduling the UE in the uplink over the unlicensed carrier;

if the uplink channel quality information includes the number of devices in an enabled operating state over the unlicensed carrier in each other unlicensed system than the system where the UE is located, then judging, by the network-side device, whether the number of devices in an enabled operating state in the other unlicensed system is below a third threshold, and if so, then scheduling the UE in the uplink over the unlicensed carrier, otherwise, not scheduling the UE in the uplink over the unlicensed carrier; and if the uplink channel quality information includes the total power of the other unlicensed systems than the system where the UE is located, over the unlicensed carrier, then judging, by the network-side device, whether the total power is below a fourth threshold, and if so, scheduling the UE in the uplink over the unlicensed carrier, otherwise, not scheduling the UE in the uplink over the unlicensed carrier.

Preferably judging, by the network-side device, whether to schedule the UE in the downlink over the unlicensed carrier, according to the received downlink channel quality information includes:

judging, by the network-side device, whether the RSSI is above a fifth threshold; and if so, then scheduling the UE in the downlink over the unlicensed carrier, otherwise, not scheduling the UE in the downlink over the unlicensed carrier.

Preferably after the network-side device judges whether to schedule the UE in the uplink over the unlicensed carrier, according to the received uplink channel quality information, the method further includes:

sending, by the network-side device, scheduling signaling for uplink scheduling over the unlicensed carrier, over the licensed carrier upon judging to schedule the UE in the uplink over the unlicensed carrier.

Preferably before the network-side device receives the uplink channel quality information from the UE, the method further includes:

configuring, by the network-side device, the UE with a set of uplink sub-frames for measuring the uplink channel.

An embodiment of the invention provides another method for scheduling over a carrier, the method including:

measuring, by a network-side device, a downlink channel in downlink sub-frames or a downlink measurement period of time, and determining downlink channel quality information;

and judging, by the network-side device, whether to schedule in the downlink over an unlicensed carrier, according to the determined downlink channel quality information.

Preferably the downlink channel quality information according to an embodiment of the invention includes a part or all of the following information:

a RSSI, a success probability of potential competition for the downlink channel, the number of devices in an enabled operating state over the unlicensed carrier in each other unlicensed system than a system where the network-side device is located, and total power of the other unlicensed systems than the system where the network-side device is located, over the unlicensed carrier.

Preferably the downlink channel quality information includes the success probability of potential competition for the downlink channel, and the downlink measurement period of time is a competition window; and measuring, by the network-side device, the downlink channel in the downlink measurement period of time, and determining the downlink channel quality information includes:

determining, by the network-side device, the competition window for resource competition; and measuring, by the network-side device, the downlink channel in the determined competition window, and determining the downlink channel quality information.

Preferably judging, by the network-side device, whether to schedule in the downlink over the unlicensed carrier, according to the determined downlink channel quality information includes:

if the downlink channel quality information includes the RSSI, then judging, by the network-side device, whether the RSSI is below a sixth threshold, and if so, then scheduling in the downlink over the unlicensed carrier; otherwise, not scheduling in the downlink over the unlicensed carrier;

if the downlink channel quality information includes the success ratio of potential competition for the downlink channel, then judging, by the network-side device, whether the success ratio of potential competition for the downlink channel is above a seventh threshold, and if so, then scheduling in the downlink over the unlicensed carrier; otherwise, not scheduling in the downlink over the unlicensed carrier;

if the downlink channel quality information includes the number of devices in an enabled operating state over the unlicensed carrier in each other unlicensed system than the system where the network-side device is located, then judging, by the network-side device, whether the number of devices in an enabled operating state in the other unlicensed system is below an eighth threshold, and if so, then scheduling in the downlink over the unlicensed carrier; otherwise, not scheduling in the downlink over the unlicensed carrier; and if the downlink channel quality information includes the total power of the other unlicensed systems than the system where the network-side device is located, over the unlicensed carrier, then judging, by the network-side device, whether the total power is below a ninth threshold, and if so, then scheduling in the downlink over the unlicensed carrier; otherwise, not scheduling in the downlink over the unlicensed carrier.

An embodiment of the invention provides a UE for scheduling over a carrier, the UE including:

a first information determining module configured to measure an uplink channel in uplink sub-frames or an uplink measurement period of time over an unlicensed carrier, and to determine uplink channel quality information, and/or to measure a downlink channel in downlink sub-frames over the unlicensed carrier, and to determine downlink channel quality information; and a notifying module configured to notify a network-side device of the determined uplink channel quality information, so that the network-side device judges whether to schedule the UE in the uplink over the unlicensed carrier, according to the received uplink channel quality information; to notify the network-side device of the determined downlink channel quality information, so that the network-side device judges whether to schedule the UE in the downlink over the unlicensed carrier, according to the received downlink channel quality information.

Preferably the uplink channel quality information includes a part or all of the following information:

a RSSI, a success probability of potential competition for the uplink channel, the number of devices in an enabled operating state over the unlicensed carrier in each other unlicensed system than a system where the UE is located, and total power of the other unlicensed systems than the system where the UE is located, over the unlicensed carrier; and the downlink channel quality information includes a RSSI.

Preferably the uplink channel quality information includes the success probability of potential competition for the uplink channel, and the uplink measurement period of time is a competition window; and the first information determining module is configured:

if the uplink channel is measured in the uplink measurement period of time, and the uplink channel quality information is determined, to determine the competition window for resource competition; and to measure the uplink channel in the determined competition window, and to determine the uplink channel quality information.

Preferably the first information determining module is configured:

if the uplink channel is measured in the uplink sub-frames over the unlicensed carrier, and the uplink channel quality information is determined, to measure the uplink channel in a set of uplink sub-frames configured by the network side, and to determine the uplink channel quality information.

Preferably the first information determining module configured to measure the uplink channel is configured:

if the uplink channel quality information includes the number of devices in an enabled operating state over the unlicensed carrier in each other unlicensed system than the system where the UE is located, to determine the number of devices in an enabled operating state over the unlicensed carrier in each other unlicensed system than the system where the UE is located, through a first standalone module configured in the UE to operate in the other unlicensed system; and if the uplink channel quality information includes the total power of the other unlicensed systems than the system where the UE is located, over the unlicensed carrier, to determine the total power of the other unlicensed systems than the system where the UE is located, over the unlicensed carrier, through second standalone modules configured in the UE to operate in the other unlicensed systems.

An embodiment of the invention provides a network-side device for scheduling over a carrier, the network-side device including:

a receiving module configured to receive uplink channel quality information and/or downlink channel quality information fed back from a UE for an unlicensed carrier; and a first judging module configured to judge whether to schedule the UE in the uplink over the unlicensed carrier, according to the received uplink channel quality information; and to judge whether to schedule the UE in the downlink over the unlicensed carrier, according to the received downlink channel quality information.

Preferably the uplink channel quality information includes a part or all of the following information:

a RSSI, a success probability of potential competition for the uplink channel, the number of devices in an enabled operating state over the unlicensed carrier in each other unlicensed system than a system where the UE is located, and total power of the other unlicensed systems than the system where the UE is located, over the unlicensed carrier; and the downlink channel quality information includes a RSSI.

Preferably the first judging module configured to judge whether to schedule the UE in the uplink over the unlicensed carrier, according to the received uplink channel quality information is configured:

if the uplink channel quality information includes the RSSI, to judge whether the RSSI is below a first threshold, and if so, to schedule the UE in the uplink over the unlicensed carrier, otherwise, not to schedule the UE in the uplink over the unlicensed carrier; if the uplink channel quality information includes the success ratio of potential competition for the uplink channel, to judge whether the success ratio of potential competition for the uplink channel is above a second threshold, and if so, to schedule the UE in the uplink over the unlicensed carrier, otherwise, not to schedule the UE in the uplink over the unlicensed carrier; if the uplink channel quality information includes the number of devices in an enabled operating state over the unlicensed carrier in each other unlicensed system than the system where the UE is located, to judge whether the number of devices in an enabled operating state in the other unlicensed system is below a third threshold, and if so, to schedule the UE in the uplink over the unlicensed carrier, otherwise, not to schedule the UE in the uplink over the unlicensed carrier; and if the uplink channel quality information includes the total power of the other unlicensed systems than the system where the UE is located, over the unlicensed carrier, to judge whether the total power is below a fourth threshold, and if so, to schedule the UE in the uplink over the unlicensed carrier, otherwise, not to schedule the UE in the uplink over the unlicensed carrier.

Preferably the first judging module configured to judge whether to schedule the UE in the downlink over the unlicensed carrier, according to the received downlink channel quality information is configured:

to judge whether the RSSI is above a fifth threshold; and if so, to schedule the UE in the downlink over the unlicensed carrier; otherwise, not to schedule the UE in the downlink over the unlicensed carrier.

Preferably the first judging module is further configured:

after it is judged whether to schedule the UE in the uplink over the unlicensed carrier, according to the received uplink channel quality information, to send scheduling signaling for uplink scheduling over the unlicensed carrier, over the licensed carrier upon judging to schedule the UE in the uplink over the unlicensed carrier.

Preferably the first judging module is further configured:

to configure the UE with a set of uplink sub-frames for measuring the uplink channel, before the uplink channel quality information from the UE is received.

An embodiment of the invention provides a network-side device for scheduling over a carrier, the network-side device including:

a second information determining module configured to measure a downlink channel in downlink sub-frames or a downlink measurement period of time, and to determine downlink channel quality information; and a second judging module configured to judge whether to schedule in the downlink over an unlicensed carrier, according to the determined downlink channel quality information.

Preferably the downlink channel quality information includes a part or all of the following information:

a RSSI, a success probability of potential competition for the downlink channel, the number of devices in an enabled operating state over the unlicensed carrier in each other unlicensed system than a system where the network-side device is located, and total power of the other unlicensed systems than the system where the network-side device is located, over the unlicensed carrier.

Preferably the downlink channel quality information includes the success probability of potential competition for the downlink channel, and the downlink measurement period of time is a competition window; and the second information determining module is configured:

if the downlink channel is measured in the downlink measurement period of time, and the downlink channel quality information is determined, to determine the competition window for resource competition; and to measure the downlink channel in the determined competition window, and to determine the downlink channel quality information.

Preferably the second judging module is configured:

if the downlink channel quality information includes the RSSI, to judge whether the RSSI is below a sixth threshold, and if so, to schedule in the downlink over the unlicensed carrier; otherwise, not to schedule in the downlink over the unlicensed carrier; if the downlink channel quality information includes the success ratio of potential competition for the downlink channel, to judge whether the success ratio of potential competition for the downlink channel is above a seventh threshold, and if so, to schedule in the downlink over the unlicensed carrier; otherwise, not to schedule in the downlink over the unlicensed carrier; if the downlink channel quality information includes the number of devices in an enabled operating state over the unlicensed carrier in each other unlicensed system than the system where the network-side device is located, to judge whether the number of devices in an enabled operating state in the other unlicensed system is below an eighth threshold, and if so, to schedule in the downlink over the unlicensed carrier; otherwise, not to schedule in the downlink over the unlicensed carrier; and if the downlink channel quality information includes the total power of the other unlicensed systems than the system where the network-side device is located, over the unlicensed carrier, to judge whether the total power is below a ninth threshold, and if so, to schedule in the downlink over the unlicensed carrier; otherwise, not to schedule in the downlink over the unlicensed carrier.

In the embodiments of the invention, the UE measures an uplink channel in uplink sub-frames or an uplink measurement period of time over an unlicensed carrier, and determines uplink channel quality information, and/or measures a downlink channel in downlink sub-frames over the unlicensed carrier, and determines downlink channel quality information; notifies the network-side device of the determined uplink channel quality information, so that the network-side device judges whether to schedule the UE in the uplink over the unlicensed carrier, according to the received uplink channel quality information; and the UE notifies the network-side device of the determined downlink channel quality information, so that the network-side device judges whether to schedule the UE in the downlink over the unlicensed carrier, according to the received downlink channel quality information, thus enabling scheduling over the unlicensed carrier so as to improve the performance of the system.

DETAILED DESCRIPTION OF THE EMBODIMENTS

In embodiments of the invention, a UE measures an uplink channel in uplink sub-frames or an uplink measurement period of time over an unlicensed carrier, and determines uplink channel quality information, and/or measures a downlink channel in downlink sub-frames over the unlicensed carrier, and determines downlink channel quality information; notifies a network-side device of the determined uplink channel quality information, so that the network-side device judges whether to schedule the UE in the uplink over the unlicensed carrier, according to the received uplink channel quality information; and the UE notifies the network-side device of the determined downlink channel quality information, so that the network-side device judges whether to schedule the UE in the downlink over the unlicensed carrier, according to the received downlink channel quality information, thus enabling scheduling over the unlicensed carrier so as to improve the performance of a system.

In embodiments of the invention, a UE/eNB operating over an unlicensed frequency band measures the quality of a channel over an unlicensed carrier. With the quality of the channel measured by the UE/eNB, a success probability and an interference condition of the UE/eNB competing for the channel in the LBT mode can be better reflected, so the measurement result can assist the eNB in scheduling data in the unlicensed frequency band to thereby improve the success probability of scheduling so as to avoid or alleviate a situation where there is such blind scheduling that a scheduling grant is sent to the UE, but the eNB/UE cannot preempt the channel, thus improving the operating efficiency of the LTE system in the unlicensed frequency band.

The embodiments of the invention will be described below in further details with reference to the drawings.

Figure 1:
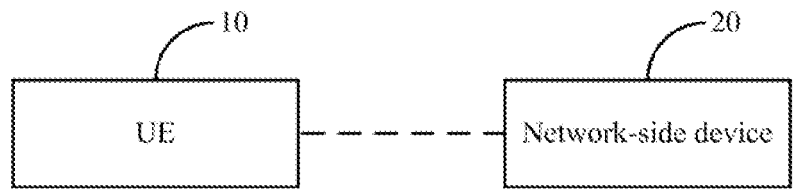
FIG. 1 is a schematic structural diagram of a system for scheduling over a carrier according to a first embodiment of the invention.

As illustrated in FIG. 1, a system for scheduling over a carrier according to a first embodiment of the invention includes a UE 10 and a network-side device 20, where:

The UE 10 is configured to measure an uplink channel in uplink sub-frames or an uplink measurement period of time over an unlicensed carrier, and to determine uplink channel quality information, and/or to measure a downlink channel in downlink sub-frames over the unlicensed carrier, and to determine downlink channel quality information; to notify a network-side device of the determined uplink channel quality information, so that the network-side device judges whether to schedule the UE in the uplink over the unlicensed carrier, according to the received uplink channel quality information; to notify the network-side device of the determined downlink channel quality information, so that the network-side device judges whether to schedule the UE in the downlink over the unlicensed carrier, according to the received downlink channel quality information; and The network-side device 200 is configured to measure the downlink channel in the downlink sub-frames or the downlink measurement period of time, and to determine downlink channel quality information; and to judge whether to schedule in the downlink over the unlicensed carrier according to the determined downlink channel quality information.

Preferably the uplink channel quality information according to an embodiment of the invention includes but will not be limited to a part or all of the following information:

A Received Signal Strength Indicator (RSSI), a success probability of potential competition for the uplink channel, the number of devices in an enabled operating state over the unlicensed carrier in each other unlicensed system than a system where the UE is located, and total power of the other unlicensed systems than the system where the UE is located, over the unlicensed carrier.

In an implementation, the number of devices in an enabled operating state over the unlicensed carrier in each other unlicensed system than the system where the UE is located can be the number of devices measured or detected in each other unlicensed system than the system where the UE is located.

For example, the number of devices in an enabled operating state over the unlicensed carrier in each other unlicensed system than the system where the UE is located is the number of devices, for which a hotspot is enabled, detected over a WiFi network, the number of devices detected through Bluetooth, etc.

Here the success probability of potential competition for the uplink channel is a success probability that the UE competes for a Physical Uplink Shared Channel (PUSCH) in the LBT mode after being scheduled by the eNB.

If the uplink channel quality information includes the number of devices in an enabled operating state over the unlicensed carrier in each other unlicensed system than the system where the UE is located, then the UE will determine the number of devices in an enabled operating state over the unlicensed carrier in each other unlicensed system than the system where the UE is located, through a first standalone module configured in the UE to operate in the other unlicensed system; and If the uplink channel quality information includes the total power of the other unlicensed systems than the system where the UE is located, over the unlicensed carrier, then the UE will determine the total power of the other unlicensed systems than the system where the UE is located, over the unlicensed carrier, through second standalone modules configured in the UE to operate in the other unlicensed systems.

For example, in an LTE UE operating over an unlicensed carrier, there are typically configured standalone dedicated chips or module units of WiFi, Bluetooth, and other unlicensed systems, and in the two examples above, the LTE UE operating over the unlicensed carrier can invoke the configured standalone dedicated chips or module units of the WiFi, Bluetooth, and other unlicensed systems to measure these WiFi, Bluetooth, and other unlicensed systems respectively to thereby obtain the respective numbers of enabled nodes in these WiFi, Bluetooth, and other unlicensed systems, or respective total probabilities of signals in these WiFi, Bluetooth, and other unlicensed systems.

Preferably the downlink channel quality information according to an embodiment of the invention includes but will not be limited to a RSSI.

If the network-side device receives the uplink channel quality information, then it will judge whether to schedule the UE in the uplink over the unlicensed carrier, according to the received uplink channel quality information; and If the network-side device receives the downlink channel quality information, then it will judge whether to schedule the UE in the downlink over the unlicensed carrier, according to the received downlink channel quality information.

Preferably the network-side device sends scheduling signaling, e.g., a Physical Downlink Control Channel (PDCCH), for uplink scheduling over the unlicensed carrier, over the licensed carrier upon judging to schedule the UE in the uplink over the unlicensed carrier.

For the uplink channel measurement, if the uplink channel needs to be measured, then in order not to affect data transmission in the uplink sub-frames, the UE may measure the uplink channel in all the uplink sub-frames in which data transmission is not scheduled, or in a network-configured set of uplink sub-frames.

If the UE measures in the network-configured set of uplink sub-frames, then the network-side device will configure the UE with a set of uplink sub-frames for measuring the uplink channel, before the uplink channel quality information from the UE is received.

For the downlink channel measure, if the measurement needs to be made in the downlink sub-frames, then the UE may measure in all the downlink sub-frames (e.g., measure a RSSI), or in a network-configured measurement-specific set of downlink sub-frames (e.g., if operating conditions of other unlicensed devices need to be measured, then a UE-specific set of downlink measurement sub-frames for measurement will be configured).

If the UE measures in the network-configured set of uplink sub-frames, then the network-side device will configure the UE with a set of uplink sub-frames for measuring the downlink channel, before the downlink channel quality information from the UE is received.

In an implementation, if the uplink channel quality information includes the success probability of potential competition for the uplink channel, then a statistics will be made of measurements in uplink sub-frames of a competition resource, or a preset completion resource period of time (e.g., a competition window).

For example, the uplink channel quality information includes the success probability of potential competition for the uplink channel, and the uplink measurement period of time is a competition window; and if the UE measures the uplink channel in the uplink measurement period of time, and determines the uplink channel quality information, then the UE will determine the competition window for resource competition; and measure the uplink channel in the determined competition window, and determine the uplink channel quality information.

Preferably in order to increase the number of samples, alternatively a statistics can be made of results of channel competition in uplink sub-frames in which data are transmitted, or the preset competition resource period of time (competition window).

In an implementation, in order to trade off between power consumption of the UE, and improvement for accuracy and objectivity of the measurement, the UE can periodically select, and measure in, a part of uplink sub-frames and/or downlink sub-frames. Preferably the length of time of the periodicity can be the length of a radio frame, for example, if the length of a radio frame is 10 ms, then the UE will measure once at an interval of 10 ms, where the UE can measure only in a first sub-frame, or first and second sub-frames, but the total measurement period of time will be no less than 10 radio frames (100 ms), and the UE will average, or make a statistic of, results in the plurality of measurement sub-frames.

Particularly for the uplink measurement, the UE measures the uplink channel periodically in the uplink sub-frames or the uplink measurement period of time, and determines the uplink channel quality information, where:

If the UE measures the uplink channel in the uplink sub-frames, then the UE will notify the network-side device of the uplink channel quality information if the number of uplink sub-frames in which the uplink channel is measured is above a first threshold; and If the UE measures the uplink channel in the uplink measurement period of time, then the UE will notify the network-side device of the uplink channel quality information if the total length of time of the uplink measurement period of time in which the uplink channel is measured is more than a first length of time.

For the downlink measurement, the UE measures the downlink channel periodically in the downlink sub-frames, and determines the downlink channel quality information, where:

If the number of downlink sub-frames in which the downlink channel is measured is above a second threshold, the UE will notify the network-side device of the downlink channel quality information.

Preferably if the uplink channel quality information includes the RSSI, then the UE will measure a RSSI in each available measurement sub-frame, and average RSSI results in the sub-frames, of which the number is not below the first threshold, as a final measurement result.

Preferably if the uplink channel quality information includes the success probability of potential competition for the uplink channel, then for an uplink sub-frame of a competition resource, if the UE does not receive any scheduling signaling corresponding to data transmission in the sub-frame, then in order to measure the success probability of competition, then the UE will assume that data need to be transmitted in the uplink sub-frame, and compete for the resource (but actually the UE will not transmit any data even upon successful competition). The UE competes for the resource in the competition window (the uplink measurement period of time above), for example, in the LBT mode, and if the current resource competition succeeds, then the number of successes in the current statistics will be incremented by 1. In order to increase the number of samples, the UE can alternatively make a statistics of results of channel competition in uplink sub-frames in which data are scheduled. If a predetermined third threshold for the number of times that a statistics is made is reached, then the ratio of the number of competition successes to the total number of competition attempts will be calculated as a measurement result.

Preferably if the uplink channel quality information includes the number of devices in an enabled operating state over the unlicensed carrier in each other unlicensed system than the system where the UE is located, and/or the total power of the other unlicensed systems than the system where the UE is located, over the unlicensed carrier, then the UE will enable its operating modules to which the other unlicensed systems are acceptable (e.g., a WiFi chip), and determine operating states of the other unlicensed systems, in available measurement sub-frames.

Preferably the uplink channel quality information can further include a load condition of each other unlicensed system than the system where the UE is located, over the unlicensed carrier.

The load condition includes but will not be limited to signal strength, a proportion of occupied channels, etc.

With the information above, the measurement result can be reported separately, or an integrated evaluation result of a part or all of the operating states, the total power, and the load conditions, of the other unlicensed systems can be reported.

Here the measurement result can be transmitted to an LTE module via a preset interface.

The reporting UE can report the measurement result as a particular value, e.g., a RSSI value, a success probability of channel competition, the number of enabled devices, total power, etc.; or can be a result of quantifying a channel condition corresponding to the value, for example, a RSSI value in some interval of values corresponds to a channel quality level "1", a RSSI value in another interval of values corresponds to a channel quality level "2", and so on, as long as the UE and the network side agree on a quantifying method in the interval of data.

The reporting UE can report the measurement result to the network side over a

Physical Uplink Control Channel (PUCCH) or a PUSCH in the licensed frequency band periodically or upon being triggered by the network side.

The UE reporting the results of measuring the uplink channel and the downlink channel needs to distinguish between the measurement results, for example, the UE distinguishes between the uplink channel quality information and the downlink channel quality information by reporting the information over different channels or at different instances of time.

In an implementation, the network-side device judges whether to schedule the UE in the uplink over the unlicensed carrier, according to the received uplink channel quality information as follows:

If the uplink channel quality information includes the RSSI, then the network-side device will judge whether the RSSI is below a first threshold, and if so, then it will schedule the UE in the uplink over the unlicensed carrier; otherwise, it will not schedule the UE in the uplink over the unlicensed carrier;

If the uplink channel quality information includes the success ratio of potential competition for the uplink channel, then the network-side device will judge whether the success ratio of potential competition for the uplink channel is above a second threshold, and if so, then it will schedule the UE in the uplink over the unlicensed carrier; otherwise, it will not schedule the UE in the uplink over the unlicensed carrier;

If the uplink channel quality information includes the number of devices in an enabled operating state over the unlicensed carrier in each other unlicensed system than the system where the UE is located, then the network-side device will judge whether the number of devices in an enabled operating state in the other unlicensed system is below a third threshold, and if so, then it will schedule the UE in the uplink over the unlicensed carrier; otherwise, it will not schedule the UE in the uplink over the unlicensed carrier; and If the uplink channel quality information includes the total power of the other unlicensed systems than the system where the UE is located, over the unlicensed carrier, then the network-side device will judge whether the total power is below a fourth threshold, and if so, then it will schedule the UE in the uplink over the unlicensed carrier; otherwise, it will not schedule the UE in the uplink over the unlicensed carrier.

The network-side device judges whether to schedule the UE in the downlink over the unlicensed carrier, according to the received downlink channel quality information as follows:

The network-side device judges whether the RSSI is above a fifth threshold, and if so, then it will schedule the UE in the downlink over the unlicensed carrier; otherwise, it will not schedule the UE in the downlink over the unlicensed carrier.

For example, before data are scheduled in the uplink, if there is low interference (low RSSI) to the uplink channel, or a high success probability of competition for the uplink channel, or a small number of enabled devices over the unlicensed carrier, or low total power of the other unlicensed systems over the unlicensed carrier, as measured in the result reported by the UE, then data may be scheduled for the UE in the uplink. Since there is a high success probability of scheduling the UE at this time, there is a low possibility of wasting a scheduling grant, so the scheduling grant can be sent over either the unlicensed carrier or the licensed carrier.

In another example, before data are scheduled in the downlink, if there is low interference (low RSSI) to the downlink channel as measured in the result reported by the UE, then data may be scheduled for the UE in the downlink. Since there is a high success probability of scheduling the UE at this time, there is a low possibility of wasting a scheduling grant, so the scheduling grant can be sent over either the unlicensed carrier or the licensed carrier.

With the solution according to the embodiments of the invention, a success probability of scheduling over the unlicensed can be improved, a waste of a scheduling grant can be alleviated, and the efficiency of the system can be improved.

Here the network-side device according to the embodiments of the invention can be an eNB (e.g., a macro eNB, a home eNB, etc.), or can be a Relay Node (RN) device, or another network-side device.

Figure 2:
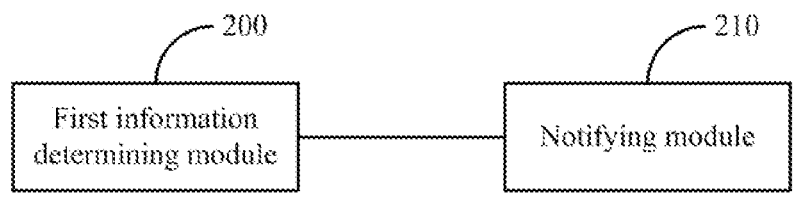
FIG. 2 is a schematic structural diagram of a UE according to a second embodiment of the invention.

As illustrated in FIG. 2, a UE according to a second embodiment of the invention includes a first information determining module 200 and a notifying module 210, where:

The first information determining module 200 is configured to measure an uplink channel in uplink sub-frames or an uplink measurement period of time over an unlicensed carrier, and to determine uplink channel quality information, and/or to measure a downlink channel in downlink sub-frames over the unlicensed carrier, and to determine downlink channel quality information; and The notifying module 210 is configured to notify a network-side device of the determined uplink channel quality information, so that the network-side device judges whether to schedule the UE in the uplink over the unlicensed carrier, according to the received uplink channel quality information; to notify the network-side device of the determined downlink channel quality information, so that the network-side device judges whether to schedule the UE in the downlink over the unlicensed carrier, according to the received downlink channel quality information.

Preferably the uplink channel quality information includes a part or all of the following information:

A RSSI, a success probability of potential competition for the uplink channel, the number of devices in an enabled operating state over the unlicensed carrier in each other unlicensed system than a system where the UE is located, and total power of the other unlicensed systems than the system where the UE is located, over the unlicensed carrier; and The downlink channel quality information includes a RSSI.

Preferably the uplink channel quality information includes the success probability of potential competition for the uplink channel, and the uplink measurement period of time is a competition window; and The first information determining module 200 is configured:

If the uplink channel is measured in the uplink measurement period of time to determine the uplink channel quality information, to determine the competition window for resource competition; and to measure the uplink channel in the determined competition window, and to determine the uplink channel quality information.

Preferably the first information determining module 200 is configured:

If the uplink channel is measured in the uplink sub-frames over the unlicensed carrier to determine the uplink channel quality information, to measure the uplink channel in a set of uplink sub-frames configured by the network side, and to determine the uplink channel quality information.

Preferably the first information determining module 200 configured to measure the uplink channel is configured:

If the uplink channel quality information includes the number of devices in an enabled operating state over the unlicensed carrier in each other unlicensed system than the system where the UE is located, to determine the number of devices in an enabled operating state over the unlicensed carrier in each other unlicensed system than the system where the UE is located, through a first standalone module configured in the UE to operate in the other unlicensed system; and if the uplink channel quality information includes the total power of the other unlicensed systems than the system where the UE is located, over the unlicensed carrier, to determine the total power of the other unlicensed systems than the system where the UE is located, over the unlicensed carrier, through second standalone modules configured in the UE to operate in the other unlicensed systems.

Figure 3:
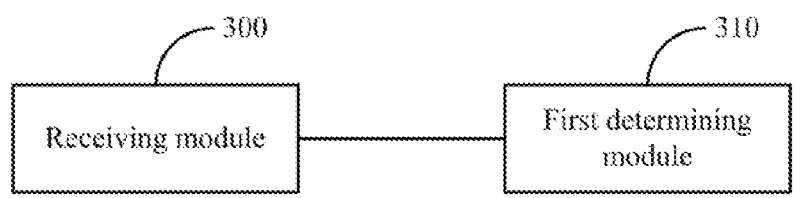
FIG. 3 is a schematic structural diagram of a network-side device according to a third embodiment of the invention.

As illustrated in FIG. 3, a network-side device according to a third embodiment of the invention includes a receiving module 300 and a first judging module 310, where:

The receiving module 300 is configured to receive uplink channel quality information and/or downlink channel quality information fed back from a UE for an unlicensed carrier; and The first judging module 310 is configured to judge whether to schedule the UE in the uplink over the unlicensed carrier, according to the received uplink channel quality information;

and to judge whether to schedule the UE in the downlink over the unlicensed carrier, according to the received downlink channel quality information.

Preferably the uplink channel quality information includes a part or all of the following information:

A RSSI, a success probability of potential competition for the uplink channel, the number of devices in an enabled operating state over the unlicensed carrier in each other unlicensed system than a system where the UE is located, and total power of the other unlicensed systems than the system where the UE is located, over an unlicensed carrier; and The downlink channel quality information includes a RSSI.

Preferably the first judging module 310 configured to judge whether to schedule the UE in the uplink over the unlicensed carrier, according to the received uplink channel quality information is configured:

If the uplink channel quality information includes the RSSI, to judge whether the RSSI is below a first threshold, and if so, to schedule the UE in the uplink over the unlicensed carrier, otherwise, not to schedule the UE in the uplink over the unlicensed carrier; if the uplink channel quality information includes the success ratio of potential competition for the uplink channel, to judge whether the success ratio of potential competition for the uplink channel is above a second threshold, and if so, to schedule the UE in the uplink over the unlicensed carrier, otherwise, not to schedule the UE in the uplink over the unlicensed carrier; if the uplink channel quality information includes the number of devices in an enabled operating state over the unlicensed carrier in each other unlicensed system than the system where the UE is located, to judge whether the number of devices in an enabled operating state in the other unlicensed system is below a third threshold, and if so, to schedule the UE in the uplink over the unlicensed carrier, otherwise, not to schedule the UE in the uplink over the unlicensed carrier; and if the uplink channel quality information includes the total power of the other unlicensed systems than the system where the UE is located, over the unlicensed carrier, to judge whether the total power is below a fourth threshold, and if so, to schedule the UE in the uplink over the unlicensed carrier, otherwise, not to schedule the UE in the uplink over the unlicensed carrier.

Preferably the first judging module 310 configured to judge whether to schedule the UE in the downlink over the unlicensed carrier, according to the received downlink channel quality information is configured:

To judge whether the RSSI is above a fifth threshold; and if so, to schedule the UE in the downlink over the unlicensed carrier, otherwise, not to schedule the UE in the downlink over the unlicensed carrier.

Preferably the first judging module 310 is further configured:

After it is judged whether to schedule the UE in the uplink over the unlicensed carrier, according to the received uplink channel quality information, to send scheduling signaling for uplink scheduling over the unlicensed carrier, over the licensed carrier upon judging to schedule the UE in the uplink over the unlicensed carrier.

Preferably the first judging module 310 is further configured:

To configure the UE with a set of uplink sub-frames for measuring the uplink channel, before the uplink channel quality information from the UE is received.

Figure 4:
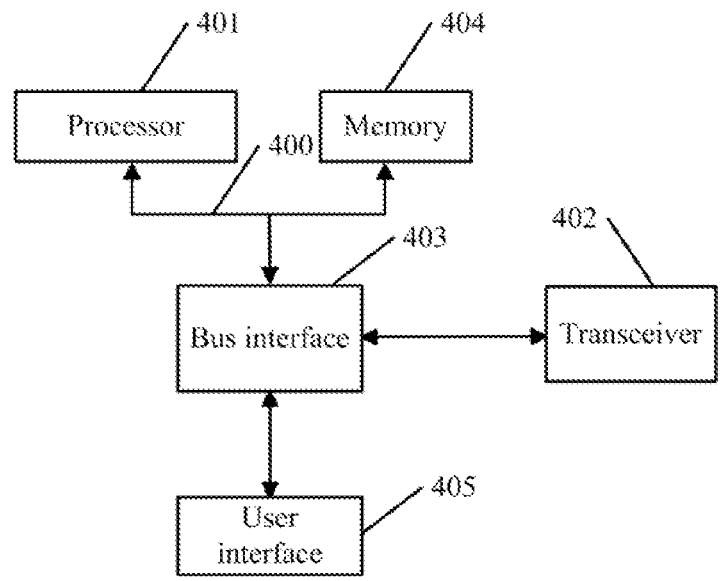
FIG. 4 is a schematic structural diagram of a UE according to a fourth embodiment of the invention.

As illustrated in FIG. 4, a UE according to a fourth embodiment of the invention includes:

A processor 401 is configured to read program in a memory 404, and to perform the processes of:

Measuring an uplink channel in uplink sub-frames or an uplink measurement period of time over an unlicensed carrier, and determining uplink channel quality information, and/or measuring a downlink channel in downlink sub-frames over the unlicensed carrier, and determining downlink channel quality information, through a transceiver 402; notifying a network-side device of the determined uplink channel quality information through the transceiver 402, so that the network-side device judges whether to schedule the UE in the uplink over the unlicensed carrier, according to the received uplink channel quality information; notifying the network-side device of the determined downlink channel quality information transceiver 402, so that the network-side device judges whether to schedule the UE in the downlink over the unlicensed carrier, according to the received downlink channel quality information; and The transceiver 402 is configured to be controlled by the processor 401 to transmit and receive data.

Preferably the uplink channel quality information includes a part or all of the following information:

A RSSI, a success probability of potential competition for the uplink channel, the number of devices in an enabled operating state over the unlicensed carrier in each other unlicensed system than a system where the UE is located, and total power of the other unlicensed systems than the system where the UE is located, over the unlicensed carrier; and The downlink channel quality information includes a RSSI.

Preferably the uplink channel quality information includes the success probability of potential competition for the uplink channel, and the uplink measurement period of time is a competition window; and The processor 401 is configured:

If the uplink channel is measured in the uplink measurement period of time to determine the uplink channel quality information, to determine the competition window for resource competition; and to measure the uplink channel in the determined competition window, and to determine the uplink channel quality information.

Preferably the processor 401 is configured:

If the uplink channel is measured in the uplink sub-frames over the unlicensed carrier to determine the uplink channel quality information, to measure the uplink channel in a set of uplink sub-frames configured by the network side, and to determine the uplink channel quality information.

Preferably the processor 401 configured to measure the uplink channel is configured:

If the uplink channel quality information includes the number of devices in an enabled operating state over the unlicensed carrier in each other unlicensed system than the system where the UE is located, to determine the number of devices in an enabled operating state over the unlicensed carrier in each other unlicensed system than the system where the UE is located, through a first standalone module configured in the UE to operate in the other unlicensed system; and if the uplink channel quality information includes the total power of the other unlicensed systems than the system where the UE is located, over the unlicensed carrier, to determine the total power of the other unlicensed systems than the system where the UE is located, over the unlicensed carrier, through second standalone modules configured in the UE to operate in the other unlicensed systems.

In FIG. 4, for a bus architecture (represented as a bus 400), the bus 400 can include any number of interconnected buses and bridges, and the bus 400 can link together various circuits including one or more processors represented by the general processor 401, and a memory represented by the memory 404. The bus 400 can further link together various other circuits, e.g., peripheral devices, a voltage stabilizer, a power management circuit, and various other circuits, all of which are well known in the art, so a further description thereof will be omitted in this context. A bus interface 403 serves as an interface between the bus 400 and the transceiver 402. The transceiver 402 can include one or more elements, e.g., a number of transmitters and receivers serving as elements configured to communicate with various other devices over a transmission medium. For example, the transceiver 402 receives external data from the other devices. The transceiver 402 is configured to transmit data processed by the processor 401 to the other devices. A user interface 405, e.g., a keypad, a display, a loudspeaker, a microphone, a joystick, etc., can be further provided, dependent upon the nature of a computing system.

The processor 401 is responsible for managing the bus 400 and performing normal processes, e.g., running a general operating system as described above. The memory 404 can store data for use by the processor 801 in performing the operations.

Optionally the processor 401 can be a CPU, an ASIC, an FPGA, or a CPLD.

Figure 5:
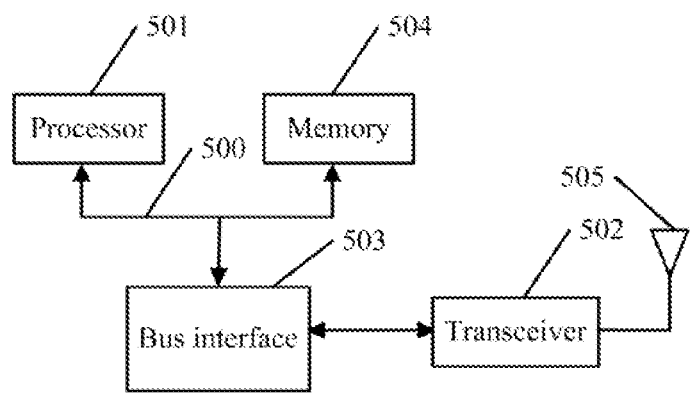
FIG. 5 is a schematic structural diagram of a network-side device according to a fifth embodiment of the invention.

As illustrated in FIG. 5, a network-side device according to a fifth embodiment of the invention includes:

A processor 501 is configured to read program in a memory 504, and to perform the processes of:

Receiving uplink channel quality information and/or downlink channel quality information fed back from a UE for an unlicensed carrier through a transceiver 502; judging whether to schedule the UE in the uplink over the unlicensed carrier, according to the received uplink channel quality information; and judging whether to schedule the UE in the downlink over the unlicensed carrier, according to the received downlink channel quality information; and The transceiver 502 is configured to be controlled by the processor 501 to transmit and receive data.

Preferably the uplink channel quality information includes a part or all of the following information:

A RSSI, a success probability of potential competition for the uplink channel, the number of devices in an enabled operating state over the unlicensed carrier in each other unlicensed system than a system where the UE is located, and total power of the other unlicensed systems than the system where the UE is located, over the unlicensed carrier; and The downlink channel quality information includes a RSSI.

Preferably the processor 501 configured to judge whether to schedule the UE in the uplink over the unlicensed carrier, according to the received uplink channel quality information is configured:

If the uplink channel quality information includes the RSSI, to judge whether the RSSI is below a first threshold, and if so, to schedule the UE in the uplink over the unlicensed carrier, otherwise, not to schedule the UE in the uplink over the unlicensed carrier; if the uplink channel quality information includes the success ratio of potential competition for the uplink channel, to judge whether the success ratio of potential competition for the uplink channel is above a second threshold, and if so, to schedule the UE in the uplink over the unlicensed carrier, otherwise, not to schedule the UE in the uplink over the unlicensed carrier; if the uplink channel quality information includes the number of devices in an enabled operating state over the unlicensed carrier in each other unlicensed system than the system where the UE is located, to judge whether the number of devices in an enabled operating state in the other unlicensed system is below a third threshold, and if so, to schedule the UE in the uplink over the unlicensed carrier, otherwise, not to schedule the UE in the uplink over the unlicensed carrier; and if the uplink channel quality information includes the total power of the other unlicensed systems than the system where the UE is located, over the unlicensed carrier, to judge whether the total power is below a fourth threshold, and if so, to schedule the UE in the uplink over the unlicensed carrier, otherwise, not to schedule the UE in the uplink over the unlicensed carrier.

Preferably the processor 501 configured to judge whether to schedule the UE in the downlink over the unlicensed carrier, according to the received downlink channel quality information is configured:

To judge whether the RSSI is above a fifth threshold; and if so, to schedule the UE in the downlink over the unlicensed carrier, otherwise, not to schedule the UE in the downlink over the unlicensed carrier.

Preferably the processor 501 is further configured:

After it is judged whether to schedule the UE in the uplink over the unlicensed carrier, according to the received uplink channel quality information, to send scheduling signaling for uplink scheduling over the unlicensed carrier, over the licensed carrier upon judging to schedule the UE in the uplink over the unlicensed carrier.

Preferably the processor 501 is further configured:

To configure the UE with a set of uplink sub-frames for measuring the uplink channel, before the uplink channel quality information from the UE is received.

In FIG. 5, for a bus architecture (represented as a bus 500), the bus 500 can include any number of interconnected buses and bridges, and the bus 500 can link together various circuits including one or more processors represented by the general processor 401, and a memory represented by the memory 504. The bus 500 can further link together various other circuits, e.g., peripheral devices, a voltage stabilizer, a power management circuit, and various other circuits, all of which are well known in the art, so a further description thereof will be omitted in this context. A bus interface 503 serves as an interface between the bus 500 and the transceiver 502. The transceiver 502 can include one or more elements, e.g., a number of transmitters and receivers serving as elements configured to communicate with various other devices over a transmission medium. Data processed by the processor 501 are transmitted through an antenna 505 over a radio medium, and furthermore data are further received and transmitted to the processor 501 through the antenna 505.

The processor 501 is responsible for managing the bus 500 and performing normal processes, and can further provide various functions including timing, a peripheral interface, voltage regulation, power management, and other control functions. The memory 504 can store data for use by the processor 501 in performing the operations.

Optionally the processor 501 can be a CPU, an ASIC, an FPGA, or a CPLD.

Based upon the same inventive idea, embodiments of the invention further provide methods for scheduling over a carrier, and since devices corresponding to these methods for scheduling over a carrier are the respective devices in the system for scheduling over a carrier according to the embodiments of the invention, and these methods address the problem under a similar principle to that of the system, reference can be made to the implementation of the system for implementations of these methods, so a repeated description thereof will be omitted here.

Figure 6:
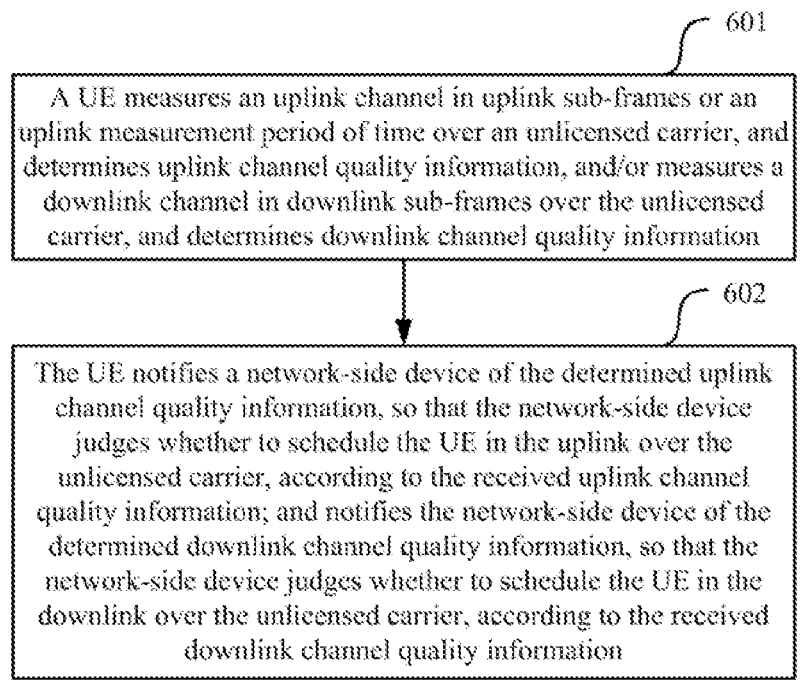
FIG. 6 is a schematic flow chart of a method for scheduling over a carrier according to a sixth embodiment of the invention.

As illustrated in FIG. 6, a method for scheduling over a carrier according to a sixth embodiment of the invention includes the following steps:

In the step 601, a UE measures an uplink channel in uplink sub-frames or an uplink measurement period of time over an unlicensed carrier, and determines uplink channel quality information, and/or measures a downlink channel in downlink sub-frames over the unlicensed carrier, and determines downlink channel quality information; and In the step 602, the UE notifies a network-side device of the determined uplink channel quality information, so that the network-side device judges whether to schedule the UE in the uplink over the unlicensed carrier, according to the received uplink channel quality information; and notifies the network-side device of the determined downlink channel quality information, so that the network-side device judges whether to schedule the UE in the downlink over the unlicensed carrier, according to the received downlink channel quality information.

Preferably the uplink channel quality information includes a part or all of the following information:

A Received Signal Strength Indicator (RSSI), a success probability of potential competition for the uplink channel, the number of devices in an enabled operating state over the unlicensed carrier in each other unlicensed system than a system where the UE is located, and total power of the other unlicensed systems than the system where the UE is located, over the unlicensed carrier; and The downlink channel quality information includes a RSSI.

Preferably the uplink channel quality information includes the success probability of potential competition for the uplink channel, and the uplink measurement period of time is a competition window; and The UE measures the uplink channel in the uplink measurement period of time, and determines the downlink channel quality information as follows:

The UE determines the competition window for resource competition; and

The UE measures the uplink channel in the determined competition window, and determines the uplink channel quality information.

Preferably the UE measures the uplink channel in the uplink sub-frames over the unlicensed carrier, and determines the uplink channel quality information as follows:

The UE measures the uplink channel in a set of uplink sub-frames configured by the network side, and determines the uplink channel quality information.

Preferably the UE measures the uplink channel as follows:

If the uplink channel quality information includes the number of devices in an enabled operating state over the unlicensed carrier in each other unlicensed system than the system where the UE is located, then the UE will determine the number of devices in an enabled operating state over the unlicensed carrier in each other unlicensed system than the system where the UE is located, through a first standalone module configured in the UE to operate in the other unlicensed system; and If the uplink channel quality information includes the total power of the other unlicensed systems than the system where the UE is located, over the unlicensed carrier, then the UE will determine the total power of the other unlicensed systems than the system where the UE is located, over the unlicensed carrier, through second standalone modules configured in the UE to operate in the other unlicensed systems.

Figure 7:
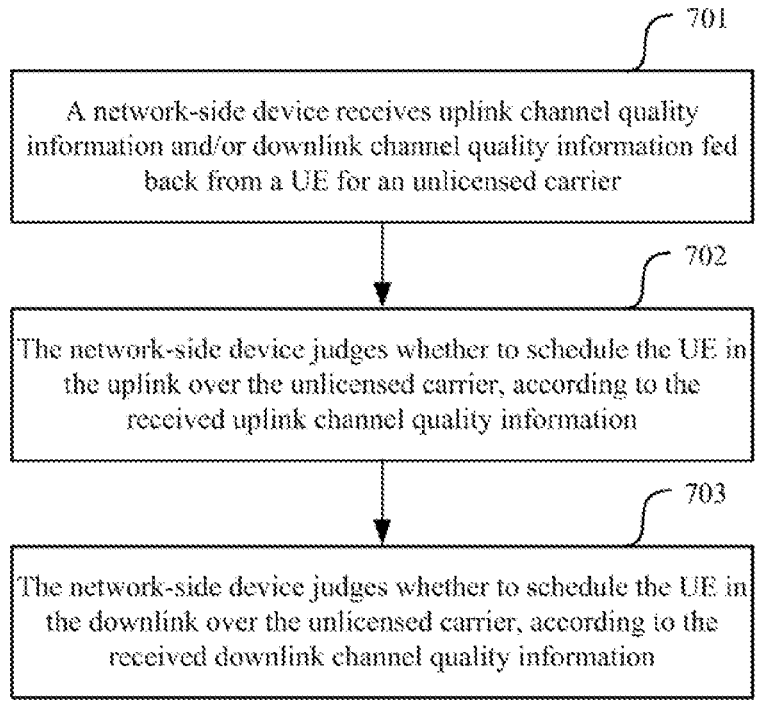
FIG. 7 is a schematic flow chart of a method for scheduling over a carrier according to a seventh embodiment of the invention.

As illustrated in FIG. 7, a method for scheduling over a carrier according to a seventh embodiment of the invention includes the following steps:

In the step 701, a network-side device receives uplink channel quality information and/or downlink channel quality information fed back from a UE for an unlicensed carrier;

In the step 702, the network-side device judges whether to schedule the UE in the uplink over the unlicensed carrier, according to the received uplink channel quality information; and In the step 703, the network-side device judges whether to schedule the UE in the downlink over the unlicensed carrier, according to the received downlink channel quality information.

Preferably the uplink channel quality information includes a part or all of the following information:

A RSSI, a success probability of potential competition for the uplink channel, the number of devices in an enabled operating state over the unlicensed carrier in each other unlicensed system than a system where the UE is located, and total power of the other unlicensed systems than the system where the UE is located, over the unlicensed carrier; and The downlink channel quality information includes a RSSI.

Preferably the network-side device judge whether to schedule the UE in the uplink over the unlicensed carrier, according to the received uplink channel quality information as follows:

If the uplink channel quality information includes the RSSI, then the network-side device will judge whether the RSSI is below a first threshold, and if so, then it will schedule the UE in the uplink over the unlicensed carrier, otherwise, it will not schedule the UE in the uplink over the unlicensed carrier;

If the uplink channel quality information includes the success ratio of potential competition for the uplink channel, then the network-side device will judge whether the success ratio of potential competition for the uplink channel is above a second threshold, and if so, then it will schedule the UE in the uplink over the unlicensed carrier, otherwise, it will not schedule the UE in the uplink over the unlicensed carrier;

If the uplink channel quality information includes the number of devices in an enabled operating state over the unlicensed carrier in each other unlicensed system than the system where the UE is located, then the network-side device will judge whether the number of devices in an enabled operating state in the other unlicensed system is below a third threshold, and if so, then it will schedule the UE in the uplink over the unlicensed carrier, otherwise, it will not schedule the UE in the uplink over the unlicensed carrier; and If the uplink channel quality information includes the total power of the other unlicensed systems than the system where the UE is located, over the unlicensed carrier, then the network-side device will judge whether the total power is below a fourth threshold, and if so, then it will schedule the UE in the uplink over the unlicensed carrier, otherwise, it will not schedule the UE in the uplink over the unlicensed carrier.

Preferably the network-side device judges whether to schedule the UE in the downlink over the unlicensed carrier, according to the received downlink channel quality information as follows:

The network-side device judges whether the RSSI is above a fifth threshold; and if so, then the network-side device will schedule the UE in the downlink over the unlicensed carrier, otherwise, it will not schedule the UE in the downlink over the unlicensed carrier.

Preferably after the network-side device judges whether to schedule the UE in the uplink over the unlicensed carrier, according to the received uplink channel quality information, the method further includes:

The network-side device sends scheduling signaling for uplink scheduling over the unlicensed carrier, over the licensed carrier upon judging to schedule the UE in the uplink over the unlicensed carrier.

Preferably before the network-side device receives the uplink channel quality information from the UE, the method further includes:

The network-side device configures the UE with a set of uplink sub-frames for measuring the uplink channel.

Figure 8:
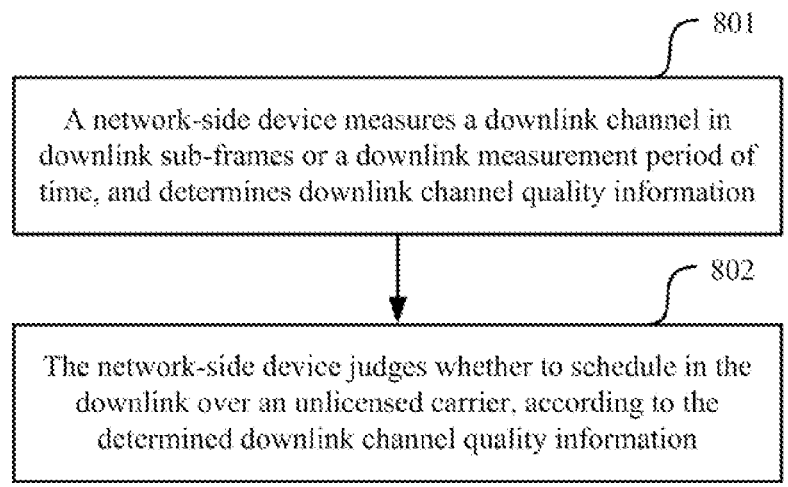
FIG. 8 is a schematic flow chart of a method for scheduling over a carrier according to an eighth embodiment of the invention.

As illustrated in FIG. 8, a method for scheduling over a carrier according to an eighth embodiment of the invention includes the following steps:

In the step 801, a network-side device measures a downlink channel in downlink sub-frames or a downlink measurement period of time, and determines downlink channel quality information; and In the step 802, the network-side device judges whether to schedule in the downlink over an unlicensed carrier, according to the determined downlink channel quality information.

Preferably the downlink channel quality information according to an embodiment of the invention includes but will not be limited to a part or all of the following information:

A RSSI, a success probability of potential competition for the downlink channel, the number of devices in an enabled operating state over the unlicensed carrier in each other unlicensed system than a system where the network-side device is located, and total power of the other unlicensed systems than the system where the network-side device is located, over the unlicensed carrier.

In an implementation, the number of devices in an enabled operating state over the unlicensed carrier in each other unlicensed system than the system where the network-side device is located can be the number of devices measured or detected in each other unlicensed system than the system where the network-side device is located.

For example, the number of devices in an enabled operating state over the unlicensed carrier in each other unlicensed system than the system where the UE is located is the number of devices, for which a hotspot is enabled, detected over a WiFi network, the number of devices detected through Bluetooth, etc.

Here the success probability of potential competition for the downlink channel is a success probability that a downlink sub-frame resource for transmitting a PDSCH, a PDCCH, and other downlink physical channels is obtained.

For the measurement in the downlink sub-frames, in order not to affect data transmission in the downlink sub-frames, the network-side device may measure the downlink channel in all the downlink sub-frames in which data transmission is not scheduled.

In an implementation, if the downlink channel quality information includes the success probability of potential competition for the downlink channel, then a statistics will be made of measurements in downlink sub-frames of a competition resource, or a preset completion resource period of time (e.g., a competition window).

For example, the downlink channel quality information includes the success probability of potential competition for the downlink channel, and the downlink measurement period of time is a competition window; and if the network-side device measures the downlink channel in the downlink measurement period of time, and determines the downlink channel quality information, then the network-side device will determine the competition window for resource competition; and measure the downlink channel in the determined competition window, and determine the downlink channel quality information.

Preferably in order to increase the number of samples, alternatively a statistics can be made of results of channel competition in downlink sub-frames in which data are transmitted, or the preset competition resource period of time (competition window).

In an implementation, the network-side device can periodically select, and measure in, a part of downlink sub-frames. Preferably the length of time of the periodicity can be the length of a radio frame, for example, if the length of a radio frame is 10 ms, then the network-side device will measure once at an interval of 10 ms, and average, or make a statistics of, results in the plurality of measurement sub-frames.

Particularly for the downlink measurement, the network-side device measures the downlink channel periodically in the downlink sub-frames or the downlink measurement period of time, and determines the downlink channel quality information, where:

If the network-side device measures the downlink channel in the downlink sub-frames, then it will determine the downlink channel quality information if the number of downlink sub-frames in which the downlink channel is measured is above a fourth threshold; and If the network-side device measures the downlink channel in the downlink measurement period of time, then it will determine the downlink channel quality information if the total length of time of the downlink measurement period of time in which the downlink channel is measured is more than a second length of time.

Preferably if the downlink channel quality information includes the RSSI, then the network-side device will measure a RSSI in each available measurement sub-frame, and average RSSI results in the sub-frames, the number of which is not below the fourth threshold, as a final measurement result.

Preferably if the downlink channel quality information includes the success probability of potential competition for the downlink channel, then for an downlink sub-frame of a competition resource, if the network-side device does not receive any scheduling signaling corresponding to data transmission in the sub-frame, then in order to measure the success probability of competition, then it will assume that data need to be transmitted in the downlink sub-frame, and compete for the resource (but actually the network-side device will not transmit any data even upon successful competition).

The network-side device competes for the resource, for example, in the LBT mode, and if the current resource competition succeeds, then the number of successes in the current statistics will be incremented by 1. In order to increase the number of samples, the network-side device can alternatively make a statistics of results of channel competition in downlink sub-frames in which data are scheduled. If a predetermined fifth threshold for the number of times that a statistics is made is reached, then the ratio of the number of competition successes to the total number of competition attempts will be calculated as a measurement result.

Preferably the downlink channel quality information can further include a load condition of each other unlicensed system than the system where the network-side device is located, over the unlicensed carrier.

The load condition includes but will not be limited to signal strength, a proportion of occupied channels, etc.

With the information above, the measurement result can be determined separately, or an integrated evaluation result of a part or all of the operating states, the total power, and the load conditions, of the other unlicensed systems can be determined, e.g., using weight factors.

In an implementation, the network-side device judges whether to schedule in the downlink over the unlicensed carrier, according to the determined downlink channel quality information as follows:

If the downlink channel quality information includes the RSSI, then the network-side device will judge whether the RSSI is below a sixth threshold, and if so, then it will schedule in the downlink over the unlicensed carrier; otherwise, it will not schedule in the downlink over the unlicensed carrier;

If the downlink channel quality information includes the success ratio of potential competition for the downlink channel, then the network-side device will judge whether the success ratio of potential competition for the downlink channel is above a seventh threshold, and if so, then it will schedule in the downlink over the unlicensed carrier; otherwise, it will not schedule in the downlink over the unlicensed carrier;

If the downlink channel quality information includes the number of devices in an enabled operating state over the unlicensed carrier in each other unlicensed system than the system where the network-side device is located, then the network-side device will judge whether the number of devices in an enabled operating state in the other unlicensed system is below an eighth threshold, and if so, then it will schedule in the downlink over the unlicensed carrier; otherwise, it will not schedule in the downlink over the unlicensed carrier; and If the downlink channel quality information includes the total power of the other unlicensed systems than the system where the network-side device is located, over the unlicensed carrier, then the network-side device will judge whether the total power is below a ninth threshold, and if so, then it will schedule in the downlink over the unlicensed carrier; otherwise, it will not schedule in the downlink over the unlicensed carrier.

Here the network-side device according to the embodiments of the invention can be an eNB (e.g., a macro eNB, a home eNB, etc.), or can be a Relay Node (RN) device, or another network-side device.

Figure 9:
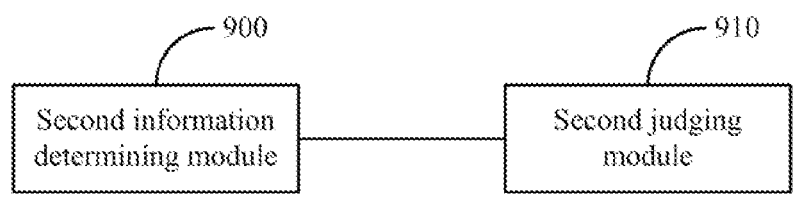
FIG. 9 is a schematic structural diagram of a network-side device according to a ninth embodiment of the invention.

As illustrated in FIG. 9, a network-side device according to an eighth embodiment of the invention includes a second information determining module 900 and a second judging module 910, where:

The second information determining module 900 is configured to measure a downlink channel in downlink sub-frames or a downlink measurement period of time, and to determine downlink channel quality information; and The second judging module 910 is configured to judge whether to schedule in the downlink over an unlicensed carrier, according to the determined downlink channel quality information.

Preferably the downlink channel quality information includes a part or all of the following information:

A RSSI, a success probability of potential competition for the downlink channel, the number of devices in an enabled operating state over the unlicensed carrier in each other unlicensed system than a system where the network-side device is located, and total power of the other unlicensed systems than the system where the network-side device is located, over the unlicensed carrier.

Preferably the downlink channel quality information includes the success probability of potential competition for the downlink channel, and the downlink measurement period of time is a competition window; and The second information determining module 900 is configured:

If the downlink channel is measured in the downlink measurement period of time to determine the downlink channel quality information, to determine the competition window for resource competition; and to measure the downlink channel in the determined competition window, and to determine the downlink channel quality information.

Preferably the second judging module 910 is configured:

If the downlink channel quality information includes the RSSI, to judge whether the RSSI is below a sixth threshold, and if so, to schedule in the downlink over the unlicensed carrier; otherwise, not to schedule in the downlink over the unlicensed carrier; if the downlink channel quality information includes the success ratio of potential competition for the downlink channel, to judge whether the success ratio of potential competition for the downlink channel is above a seventh threshold, and if so, to schedule in the downlink over the unlicensed carrier; otherwise, not to schedule in the downlink over the unlicensed carrier; if the downlink channel quality information includes the number of devices in an enabled operating state over the unlicensed carrier in each other unlicensed system than the system where the network-side device is located, to judge whether the number of devices in an enabled operating state in the other unlicensed system is below an eighth threshold, and if so, to schedule in the downlink over the unlicensed carrier; otherwise, not to schedule in the downlink over the unlicensed carrier; and if the downlink channel quality information includes the total power of the other unlicensed systems than the system where the network-side device is located, over the unlicensed carrier, to judge whether the total power is below a ninth threshold, and if so, to schedule in the downlink over the unlicensed carrier; otherwise, not to schedule in the downlink over the unlicensed carrier.

In an implementation, the functions of the network-side device in FIG. 3, and the functions of the network-side device in FIG. 9 can be integrated in an entity, and the functions of the network-side device in FIG. 3, or the functions of the network-side device in FIG. 9 can be performed selectively as needed. That is, the modules in the network-side device in FIG. 3, and the modules in the network-side device in FIG. 9 can be integrated in an entity.

Figure 10:
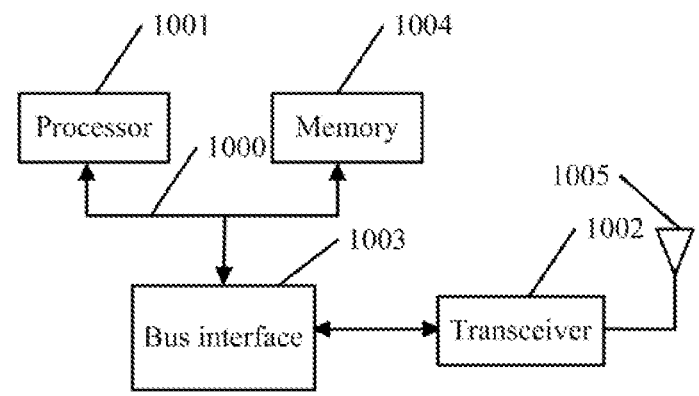
FIG. 10 is a schematic structural diagram of a network-side device according to a tenth embodiment of the invention.

As illustrated in FIG. 10, a network-side device according to an tenth embodiment of the invention includes:

A processor 1001 is configured to read program in a memory 1004, and to perform the processes of:

Measuring a downlink channel in downlink sub-frames or a downlink measurement period of time through a transceiver 1002, and determining downlink channel quality information; and judging whether to schedule in the downlink over an unlicensed carrier, according to the determined downlink channel quality information; and The transceiver 1002 is configured to be controlled by the processor 1001 to transmit and receive data.

Preferably the downlink channel quality information includes a part or all of the following information:

A RSSI, a success probability of potential competition for the downlink channel, the number of devices in an enabled operating state over the unlicensed carrier in each other unlicensed system than a system where the network-side device is located, and total power of the other unlicensed systems than the system where the network-side device is located, over the unlicensed carrier.

Preferably the downlink channel quality information includes the success probability of potential competition for the downlink channel, and the downlink measurement period of time is a competition window; and The processor 1001 is configured:

If the downlink channel is measured in the downlink measurement period of time to determine the downlink channel quality information, to determine the competition window for resource competition; and to measure the downlink channel in the determined competition window, and to determine the downlink channel quality information.

Preferably the processor 1001 is configured:

If the downlink channel quality information includes the RSSI, to judge whether the RSSI is below a sixth threshold, and if so, to schedule in the downlink over the unlicensed carrier; otherwise, not to schedule in the downlink over the unlicensed carrier; if the downlink channel quality information includes the success ratio of potential competition for the downlink channel, to judge whether the success ratio of potential competition for the downlink channel is above a seventh threshold, and if so, to schedule in the downlink over the unlicensed carrier; otherwise, not to schedule in the downlink over the unlicensed carrier; if the downlink channel quality information includes the number of devices in an enabled operating state over the unlicensed carrier in each other unlicensed system than the system where the network-side device is located, to judge whether the number of devices in an enabled operating state in the other unlicensed system is below an eighth threshold, and if so, to schedule in the downlink over the unlicensed carrier; otherwise, not to schedule in the downlink over the unlicensed carrier; and if the downlink channel quality information includes the total power of the other unlicensed systems than the system where the network-side device is located, over the unlicensed carrier, to judge whether the total power is below a ninth threshold, and if so, to schedule in the downlink over the unlicensed carrier; otherwise, not to schedule in the downlink over the unlicensed carrier.

In FIG. 10, for a bus architecture (represented as a bus 1000), the bus 1000 can include any number of interconnected buses and bridges, and the bus 1000 can link together various circuits including one or more processors represented by the processor 1001, and a memory represented by the memory 1004. The bus 1000 can further link together various other circuits, e.g., peripheral devices, a voltage stabilizer, a power management circuit, etc., all of which are well known in the art, so a further description thereof will be omitted in this context. A bus interface 1003 serves as an interface between the bus 1000 and the transceiver 1002. The transceiver 1002 can include one or more elements, e.g., a number of transmitters and receivers serving as elements configured to communicate with various other devices over a transmission medium. Data processed by the processor 1001 are transmitted through an antenna 1005 over a radio medium, and furthermore data are further received and transmitted to the processor 1001 through the antenna 1005.

The processor 1001 is responsible for managing the bus 1000 and performing normal processes, and can further provide various functions including timing, a peripheral interface, voltage regulation, power management, and other control functions. The memory 1004 can store data for use by the processor 1001 in performing the operations.

Optionally the processor 1001 can be a CPU, an ASIC, an FPGA, or a CPLD.

In an implementation, the functions of the network-side device in FIG. 5, and the functions of the network-side device in FIG. 10 can be integrated in an entity, and the functions of the network-side device in FIG. 5, or the functions of the network-side device in FIG. 10 can be performed selectively as needed. That is, the respective modules in the network-side device in FIG. 5, and the respective modules in the network-side device in FIG. 10 can be integrated in an entity.

As can be apparent from the disclosure above, in the embodiments of the invention, the UE measures an uplink channel in uplink sub-frames or an uplink measurement period of time over an unlicensed carrier, and determines uplink channel quality information, and/or measures a downlink channel in downlink sub-frames over the unlicensed carrier, and determines downlink channel quality information; notifies the network-side device of the determined uplink channel quality information, so that the network-side device judges whether to schedule the UE in the uplink over the unlicensed carrier, according to the received uplink channel quality information; and the UE notifies the network-side device of the determined downlink channel quality information, so that the network-side device judges whether to schedule the UE in the downlink over the unlicensed carrier, according to the received downlink channel quality information, thus enabling scheduling over the unlicensed carrier so as to improve the performance of the system.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for scheduling over a carrier, the method comprises:

measuring, by a UE, an uplink channel in uplink sub-frames or an uplink measurement period of time over an unlicensed carrier and a downlink channel in downlink sub-frames over the unlicensed carrier;

determining, by the UE, uplink channel quality information and downlink channel quality information according to a result of the measuring; and notifying, by the UE, a network-side device of the uplink channel quality information and the downlink channel quality information;

wherein the uplink channel quality information is used for the network-side device to determine to schedule or not to schedule the UE in the uplink over the unlicensed carrier; and the downlink channel quality information is used for the network-side device to determine to schedule or not to schedule the UE in the downlink over the unlicensed carrier;

wherein the uplink channel quality information comprises a part or all of the following information:

a Received Signal Strength Indicator (RSSI), a success probability of potential competition for the uplink channel, the number of devices in an enabled operating state over the unlicensed carrier in each other unlicensed system than a system where the UE is located, and a total power of the other unlicensed systems than the system where the UE is located, over the unlicensed carrier;

and wherein measuring, by the UE, the uplink channel comprises:

when the uplink channel quality information comprises the number of devices in an enabled operating state over the unlicensed carrier in each other unlicensed system than the system where the UE is located, determining, by the UE, the number of devices through a first standalone module configured in the UE to operate in the other unlicensed system; and when the uplink channel quality information comprises the total power of the other unlicensed systems than the system where the UE is located, over the unlicensed carrier, determining, by the UE, the total power through second standalone modules configured in the UE to operate in the other unlicensed systems.

2. The method according to claim 1, wherein the downlink channel quality information comprises a RSSI.

3. The method according to claim 1, wherein the uplink channel quality information comprises the success probability of potential competition for the uplink channel, and the uplink measurement period of time is a competition window; and measuring, by the UE, the uplink channel in the uplink measurement period of time, and determining the downlink channel quality information comprises:

determining, by the UE, the competition window for resource competition; and measuring, by the UE, the uplink channel in determined competition window, and determining the uplink channel quality information.

4. The method according to claim 1, wherein measuring, by the UE, the uplink channel in the uplink sub-frames over the unlicensed carrier, and determining the uplink channel quality information comprises:

measuring, by the UE, the uplink channel in a set of uplink sub-frames configured by the network side, and determining the uplink channel quality information.

5. A method for scheduling over a carrier, the method comprises:

receiving, by a network-side device, uplink channel quality information and/or downlink channel quality information fed back from a UE for an unlicensed carrier; wherein the uplink channel quality information indicating channel quality of an uplink channel of the UE over the unlicensed carrier, and the downlink channel quality information indicating channel quality of a downlink channel of the UE over the unlicensed carrier;

determining, by the network-side device, to schedule or not to schedule the UE in the uplink over the unlicensed carrier, according to received uplink channel quality information; and determining, by the network-side device, to schedule or not to schedule the UE in the downlink over the unlicensed carrier, according to received downlink channel quality information;

wherein the downlink channel quality information comprises a RSSI; and determining, by the network-side device, to schedule or not to schedule the UE in the downlink over the unlicensed carrier, according to the received downlink channel quality information comprises:

determining, by the network-side device, to schedule the UE in the downlink over the unlicensed carrier when the RSSI is above a fifth threshold; and determining, by the network-side device, not to schedule the UE in the downlink over the unlicensed carrier when the RSSI is not above a fifth threshold.

6. The method according to claim 5, wherein the uplink channel quality information comprises a part or all of the following information:

a RSSI, a success probability of potential competition for the uplink channel, the number of devices in an enabled operating state over the unlicensed carrier in each other unlicensed system than a system where the UE is located, and a total power of the other unlicensed systems than the system where the UE is located, over the unlicensed carrier.

7. The method according to claim 6, wherein determining, by the network-side device, to schedule or not to schedule the UE in the uplink over the unlicensed carrier, according to the received uplink channel quality information comprises:

when the uplink channel quality information comprises the RSSI: determining, by the network-side device, to schedule the UE in the uplink over the unlicensed carrier when the RSSI is below the first threshold; and, determining, by the network-side device, not to schedule the UE in the uplink over the unlicensed carrier when the RSSI is not below the first threshold;

when the uplink channel quality information comprises the success ratio of potential competition for the uplink channel determining, by the network-side device, to schedule the UE in the uplink over the unlicensed carrier when the success ratio is above the second threshold; and determining, by the network-side device, not to schedule the UE in the uplink over the unlicensed carrier when the success ratio is not above the second threshold;

when the uplink channel quality information comprises the number of devices in an enabled operating state over the unlicensed carrier in each other unlicensed system than the system where the UE is located: determining, by the network-side device, to schedule the UE in the uplink over the unlicensed carrier when the number of devices is below the third threshold; and determining, by the network-side device, not to schedule the UE in the uplink over the unlicensed carrier when the number of devices is not below the third threshold; and when the uplink channel quality information comprises the total power of the other unlicensed systems than the system where the UE is located, over the unlicensed carrier: determining, by the network-side device, to schedule the UE in the uplink over the unlicensed carrier when the total power is below a fourth threshold; and determining, by the network-side device, not to schedule the UE in the uplink over the unlicensed carrier when the total power is not below a fourth threshold.

8. The method according to claim 5, wherein after the network-side device determines to schedule the UE in the uplink over the unlicensed carrier, according to the received uplink channel quality information, the method further comprises:

sending, by the network-side device, scheduling signaling for uplink scheduling over the unlicensed carrier, over the licensed carrier.

9. The method according to claim 5, wherein before the network-side device receives the uplink channel quality information from the UE, the method further comprises:

configuring, by the network-side device, the UE with a set of uplink sub-frames over the unlicensed carrier for measuring the uplink channel.

10. A method for scheduling over a carrier, the method comprises:

measuring, by a UE, an uplink channel in uplink sub-frames or an uplink measurement period of time over an unlicensed carrier and a downlink channel in downlink sub-frames over the unlicensed carrier;

determining, by the UE, uplink channel quality information and downlink channel quality information according to a result of the measuring; and notifying, by the UE, a network-side device of the uplink channel quality information and the downlink channel quality information;

wherein the uplink channel quality information is used for the network-side device to determine to schedule or not to schedule the UE in the uplink over the unlicensed carrier; and the downlink channel quality information is used for the network-side device to determine to schedule or not to schedule the UE in the downlink over the unlicensed carrier;

wherein the uplink channel quality information comprises a part or all of the following information:

a Received Signal Strength Indicator (RSSI), a success probability of potential competition for the uplink channel, the number of devices in an enabled operating state over the unlicensed carrier in each other unlicensed system than a system where the UE is located, and a total power of the other unlicensed systems than the system where the UE is located, over the unlicensed carrier;

wherein the uplink channel quality information comprises the success probability of potential competition for the uplink channel, and the uplink measurement period of time is a competition window; and measuring, by the UE, the uplink channel in the uplink measurement period of time, and determining the downlink channel quality information comprises:

determining, by the UE, the competition window for resource competition; and measuring, by the UE, the uplink channel in determined competition window, and determining the uplink channel quality information.

11. The method according to claim 10, wherein the downlink channel quality information comprises a RSSI.

12. The method according to claim 10, wherein measuring, by the UE, the uplink channel in the uplink sub-frames over the unlicensed carrier, and determining the uplink channel quality information comprises:

measuring, by the UE, the uplink channel in a set of uplink sub-frames configured by the network side, and determining the uplink channel quality information.

13. The method according to claim 10, wherein measuring, by the UE, the uplink channel comprises:

when the uplink channel quality information comprises the number of devices in an enabled operating state over the unlicensed carrier in each other unlicensed system than the system where the UE is located, determining, by the UE, the number of devices through a first standalone module configured in the UE to operate in the other unlicensed system; and when the uplink channel quality information comprises the total power of the other unlicensed systems than the system where the UE is located, over the unlicensed carrier, determining, by the UE, the total power through second standalone modules configured in the UE to operate in the other unlicensed systems.

* * * * *